United States Patent [19]
Saalbach et al.

[11] Patent Number: 5,131,144
[45] Date of Patent: Jul. 21, 1992

[54] PROCESS FOR THE MANUFACTURE OF A PISTON/CYLINDER ASSEMBLY

[75] Inventors: Kurt Saalbach, Moerfelden/Walldorf; Heinz-Juergen Preuss, Gifhorn; Klaus Bergelin, Wermelskirchen, all of Fed. Rep. of Germany

[73] Assignee: Alfred Teves GmbH, Frankfurt am Main, Fed. Rep. of Germany

[21] Appl. No.: 658,457

[22] Filed: Feb. 22, 1991

Related U.S. Application Data

[63] Continuation of Ser. No. 422,792, Oct. 18, 1989, abandoned.

[30] Foreign Application Priority Data

Oct. 18, 1986 [DE] Fed. Rep. of Germany ....... 3835383

[51] Int. Cl.⁵ .............................................. B22D 33/04
[52] U.S. Cl. .................................. 29/888.044; 29/888; 164/97; 164/137
[58] Field of Search ................. 164/137, 47; 29/527.5, 29/527.7, 888, 888.044

[56] References Cited

U.S. PATENT DOCUMENTS

| | | | |
|---|---|---|---|
| 4,458,743 | 7/1984 | Logvinov et al. | 164/137 |
| 4,757,857 | 7/1988 | Henkel | 164/137 |
| 4,899,799 | 2/1990 | Drazy | 164/137 |
| 4,919,189 | 4/1990 | Sato et al. | 164/137 |

FOREIGN PATENT DOCUMENTS

| | | | |
|---|---|---|---|
| 0192445 | 8/1989 | Japan | 164/137 |
| 2123103 | 1/1984 | United Kingdom . | |
| 2150869 | 7/1985 | United Kingdom . | |

OTHER PUBLICATIONS

Websters Ninth New Collegiate Dictionary, definitions of the words "Film", Floating and Membrane, 1984, pp. 463; 473–474, and 740.

Primary Examiner—Irene Cuda
Attorney, Agent, or Firm—Robert P. Seitter; J. Gordon Lewis

[57] ABSTRACT

A process for the manufacture of a master cylinder for hydraulic brake units of automotive vehicles. The starting material is a pasty material which is between solid and liquid. In the course of the casting procedure, thin material wall thicknesses are created in the regions of intended openings of the master cylinder, such as the breather bore (14) and the intake bore (5). The floating membrane (12) which forms during the casting process is removed by mechanical machining to open the duct which functions as the intake bore. The breather bore (14) which functions as the compensation bore is formed by a stamping operation.

7 Claims, 3 Drawing Sheets

PROCESS FOR THE MANUFACTURE OF A PISTON/CYLINDER ASSEMBLY

This application is a continuation of application Ser. No. 07/422,792 filed Oct. 18, 1989, now abandoned.

BACKGROUND OF THE INVENTION

The present invention relates, in general, to a process for manufacturing a piston/cylinder assembly and, in particular, to the manufacture of a master cylinder for hydraulic brake units for automotive vehicles using pressure die casting starting material, squeeze die casting starting material or other fluid, semifluid, semisolid or pasty starting material, especially semisolid metal starting material (SSM material).

The present invention is concerned with a manufacturing technique which optimizes the fabrication of master cylinders. U.S. Pat. No. 4,565,066, granted on Jan. 21, 1986, corresponds to published German Patent Application No. 3 224 168 and discloses a pressure die casting mold for a master brake cylinder housing. This master brake cylinder housing has an axial master cylinder piston bore and a compensating bore. The axis of the compensating bore extends parallel to the axis of the master cylinder piston bore. The compensating bore extends between a compensating reservoir port which is disposed transverse to the longitudinal axis of the housing and a sealing chamber which is an extension of the master cylinder piston bore.

In U.S. Pat. No. 4,565,066, the casting mold has a core for the compensating bore. The longitudinal sections of this core, containing the longitudinal axis of the core, have a conical configuration with the narrowest point being adjacent to the compensating reservoir port and the cross-sections extending perpendicular to the longitudinal axis having a substantially kidney-shaped configuration with the concave side of the cross-sections facing the master cylinder piston bore.

SUMMARY OF THE INVENTION

It is an object of the present invention to decrease the manufacturing costs of the master cylinder by improving the casting process and reducing the mechanical machining operations.

It is another object of the invention to permit use of pressure die casting starting material, squeeze die casting starting material or other fluid, semifluid, semisolid or pasty starting material. In particular, the present invention permits using semisolid metal as a starting material. In the following, this material will be referred to as "SSM material."

In the so-called "squeeze die casting process," the fluid material is slowly pressed into the mold. In this way, air and gas penetration into the casting is avoided.

As indicated above, the process according to the present invention is particularly suited for using SSM material which has a pasty consistency. The material is between liquid and solid and is introduced into the casting mold with this consistency. Work pieces made from SSM material are distinguished by the absence of pores and by good hardening properties.

Another object of the present invention is to produce a precast work piece which requires only simple mechanical surface machining and/or stamping in the fabrication of hydraulic connections.

A further object of the present invention is to provide an optimized manufacturing technique for the fabrication of master cylinders, including the mounting of master cylinders and the assembly of master cylinders and brake power boosters of hydraulic brake units.

According to the present invention, these objects are achieved by forming, during the casting procedure, their walls in the regions where openings, in particular, for fluid connections are intended and then forming these openings by mechanical material removal, such as by machining or stamping. The thin walls are formed by the arrangement and/or shaping of the casting molds and/or the cores which define the spaces to be connected together.

One particularly advantageous way of forming a thin wall between the space intended to define the pressure chamber of the master cylinder and the space intended to define a hydraulic connection to the pressure chamber is to space the cores which define the pressure chamber and the hydraulic connection apart, so that a thin skin, or film forms during the casting procedure.

The film preferably is removed by a cutting or machining procedure and an opening, for example the intake bore, is formed in this manner.

Alternatively, after the film is removed by a cutting or machining procedure, the opening, for example the breather bore, can be formed by stamping.

The cutting or machining operation in the region in which the fluid reservoir is connected to the master cylinder is greatly reduced, according to the present invention, by forming the master cylinder with a flare step which, upon flanging over, retains a disc or a ring by which the plug through which the reservoir connection is made in the wall of the master cylinder is fastened to the master cylinder.

Also, according to the present invention, the complicated drilling of the intake bores is avoided by precasting the intake bore.

In the prior art, a recess, formed by a machining operation, is provided in the region of the pedal-side-end of the master cylinder housing. This recess serves to accommodate a sealing ring and to center the brake power booster which is to be assembled with the master cylinder. In accordance with another aspect of the present invention, it is possible to avoid this mechanical machining operation by forming this recess in the casting procedure.

In the same way, the through holes for the fastening elements for assembling the master cylinder and the brake power booster can be formed in the casting procedure.

According to yet another aspect of the present invention, by casting the pressure outlets, mechanical machining of the pressure connections can be limited to the boring of the restriction hole and the cutting of the thread.

According to still another aspect of the present invention, the chamber in the master cylinder, at which the master cylinder and the brake power booster are attached, has an inside wall which presents a tuyere slope directed radially outwardly in the direction of the brake pedal. This arrangement permits placing an O-ring seal between the parts which can slide in an upward direction along the tuyere slope as the parts undergo relative axial movement to accommodate tolerances in the manufacture of the parts. Mechanical machining for achieving dimensional accuracy is reduced or eliminated by this arrangement.

According to still another aspect of the present invention, a sheet or plate steel cup is provided which serves to retain the parts assembles in the master cylinder. This sheet or plate steel cup is arranged to allow it to be retained in a precast recess of the master cylinder.

According to a further aspect of the present invention, mechanical machining, in the region of the push rod piston, is reduced in that a thin cylinder wall is formed in the region of the push rod piston by precasting and the breather bore of the push rod piston is formed in this region by stamping from the inside.

According to yet another aspect of the present invention, the assembly of a vacuum brake power booster with the master cylinder is facilitated by the provision, in the booster housing, of a cup which surrounds the booster-side-end of the master cylinder and has means, for example resilient snap-in lugs, for connection of the master cylinder and the booster.

Further details of the present invention are disclosed by the following description of a number of embodiments of the invention which will be explained with reference to drawings.

DETAILED DESCRIPTION OF THE INVENTION

Figure 1:
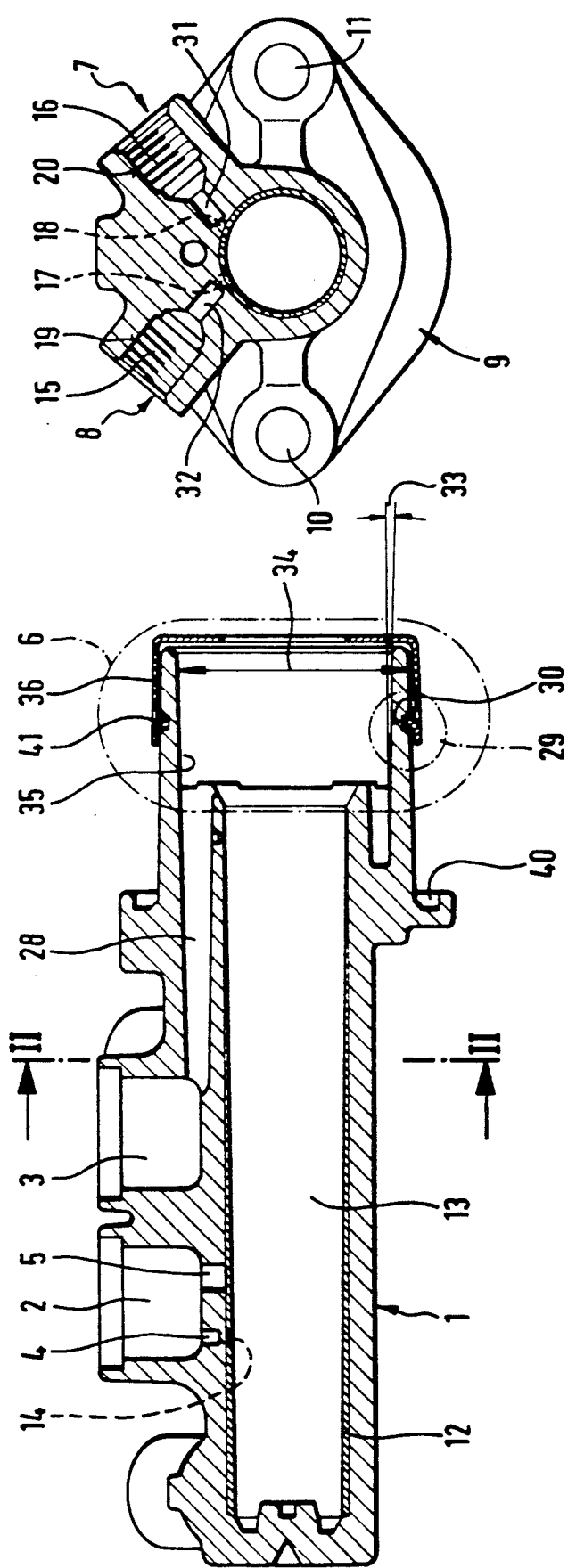
FIG. 1 is a longitudinal cross-sectional view of the housing of a tandem master cylinder constructed in accordance with the present invention.
Figure 4:
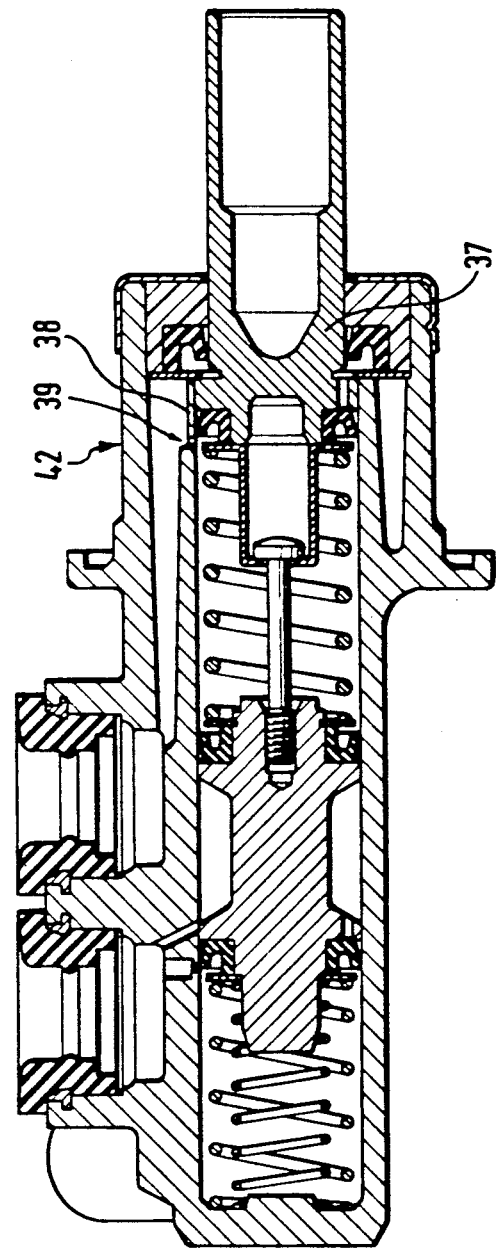
FIG. 4 is a cross-sectional view of a tandem master cylinder in the assembled condition.

Referring to FIG. 1, the housing of the tandem master cylinder is identified by reference numeral 1. Reference numerals 2 and 3 represent the reservoir ports in which the plugs of the brake fluid reservoir are inserted when the tandem master cylinder is in the assembled condition. This is shown in FIG. 4. Ports 2 and 3 and the bores 4 and 5 which are smaller in comparison to ports 2 and 3 are filled by cores during the casting procedure. The tandem master cylinder is connected to a vacuum brake power booster (not shown) at chamber 6.

The tandem master cylinder has four pressure connections. Two of these pressure connections 7 and 8 ar shown in FIG. 2.

Figure 2:
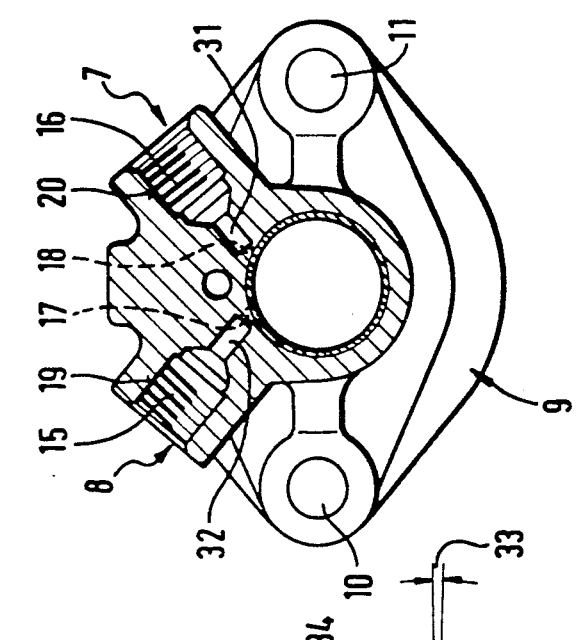
FIG. 2 is a transverse cross-sectional view taken along line II—II of FIG. 1.

Reference numeral 9 in FIG. 2 identifies the flange by which the tandem master cylinder is connected to the brake power booster. Two through holes 10 and 11 are provided in flange 9 for fastening elements which hold the master cylinder and the brake power booster together. Reference numeral 12 identifies a film which forms during the casting process and is removed subsequently by mechanical machining.

Cores are arranged in the mold during casting to form the pressure chambers of the master cylinder in the internal chamber 13 and to form ports 2 and 3. The cores used to form the ports 2 and 3 are configured to form bores 4 and 5. The core for the internal chamber 13 is configured with a slight conicity for reasons of manufacture. Film 12 remains intact after the core has been extracted from the chamber 13. As a result of the casting procedure, a portion 12' of thin film 12 is in place between the bore 5 and the internal chamber 13 of the master cylinder. In the subsequent mechanical machining, an opening to bore 5 is formed when the film 12 is removed. Bore 5 serves as the intake bore of the finished master cylinder.

The wall thickness between the bore 4 and the internal chamber 13, without the film 12, is dimensioned such that the opening 14 can be created by a simple stamping operation after removal of the film 12. This opening corresponds to the breather bore of the finished master cylinder and functions as the compensation bore.

The pressure connections 7 and 8 shown in FIG. 2 are formed by precasting the chambers 15, 16, 31 and 32 with properly positioned cores. The only machining operations that need to be carried out are the stamping and boring of the restriction ducts 17 and 18 and the cutting of the threads 19 and 20. Because the pressure connections are precast to the core diameters, the other machining operations which are performed according to prior art are unnecessary.

Figure 3:
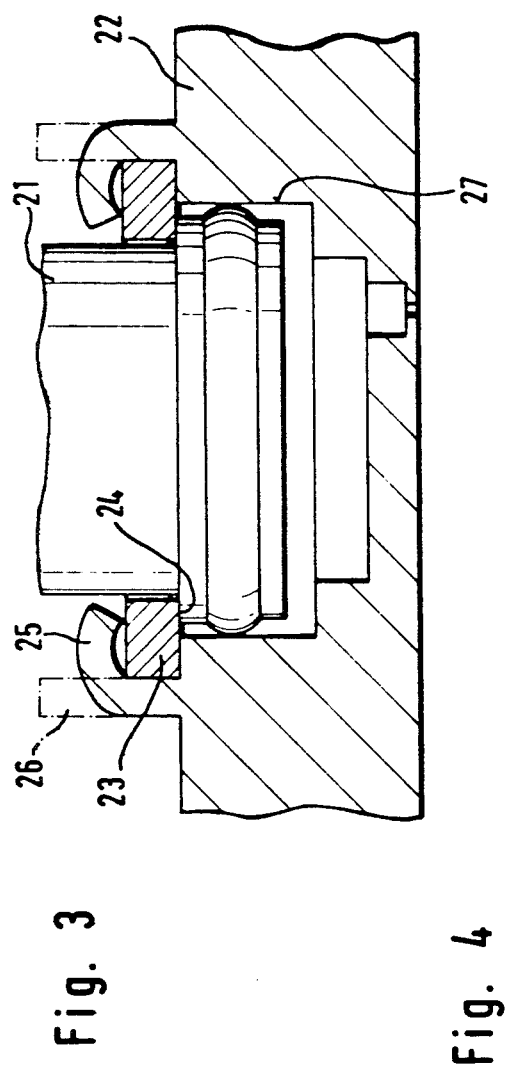
FIG. 3 is a cross-sectional view of the fastening of the brake fluid reservoir to the master cylinder.

FIG. 3 shows a plug 21 of a brake fluid reservoir. This plug 21 is retained in the wall 22 of the master cylinder by a ring 23 which is positioned against an edge 24 of the plug. The ring itself is secured to the master cylinder by flanging over the flare step 25. The flare step is fabricated in the course of the casting procedure. The original cast shape of the flare step is shown by dot-dash lines in FIG. 3 and is identified by reference numeral 26. This embodiment of the invention shows the advantage that much of the cutting procedure may be eliminated in the region where the reservoir is connected. This also applies for the wall 27 of the recess in the wall 22 of the master cylinder.

As is seen in FIG. 1, the intake bore 28 associated with the push rod piston, also, is precast. "Intake bore" is the term generally used for this passage. Because the boring operation is eliminated, according to the present invention, it is appropriate to characterize this passage as an intake bore 28.

According to the prior art, it is necessary to form, by a mechanical machining operation, a recess in the connecting flange to fit the master cylinder to the brake power booster. According to the embodiment of the invention shown in FIG. 1, the recess 40 is precast and the sealing ring is positioned between the master cylinder and the vacuum brake power booster. In addition, the recess 40 serves to center the master cylinder and the brake power booster relative to one another.

Also precast are the through holes 10 and 11 in the flange 9 of the master cylinder. These holes serve to receive the fastening elements for the assembly of the master cylinder and the vacuum brake power booster.

In the master cylinder shown in FIG. 1, chamber 6 has a tuyere slope 33 or internal conicity. This means that the internal diameter 34 of the master cylinder housing increases in the direction of the brake pedal. As the master cylinder and the brake power booster are assembled, an O-ring, for example, may be positioned in the region of the tuyere slope for sealing the master cylinder and the brake power booster.

If, for example, a bushing (not shown) is to be sealed off in the region of the inside wall 35, then an O-ring can be positioned between the inside wall 35, which presents a conical shape, and the bushing having a corresponding shape, namely, an exterior conical surface. As the bushing slides to the left, the O-ring will travel upward along the tuyere slope of the inside wall 35 and will form a seal between bushing and the inside wall. Also, a certain freedom of movement is realized along the axis of the cylinder and the brake power booster during mounting for accommodating tolerances in the manufacture of the parts.

The master cylinder components in the right hand portion of the master cylinder shown in FIG. 4 may be retained by a plate steel cup 36 as shown in FIG. 1. This cup is retained on the master cylinder housing and locked in place by means of an annular projection 41 fitted within a precast annular recess 30 in the region 29 to form a tongue-and-groove joint. Mechanical machining of the region 29 is not necessary FIG. 4 shows a part 38 of the cylinder wall in the region of the push rod piston 37 which is thinly precast. Precasting this part permits forming the breather bore 39 by a simple stamping operation from the inside.

In prior art master cylinders, it is necessary to form an opening in the region 42 of the wall of the cylinder housing through which the breather bore 39 is bored. This opening, formed in the wall of the cylinder, subsequently is closed by a plug which requires caulking. These operations are unnecessary when fabricating a master cylinder in accordance with the present invention.

Figure 5:
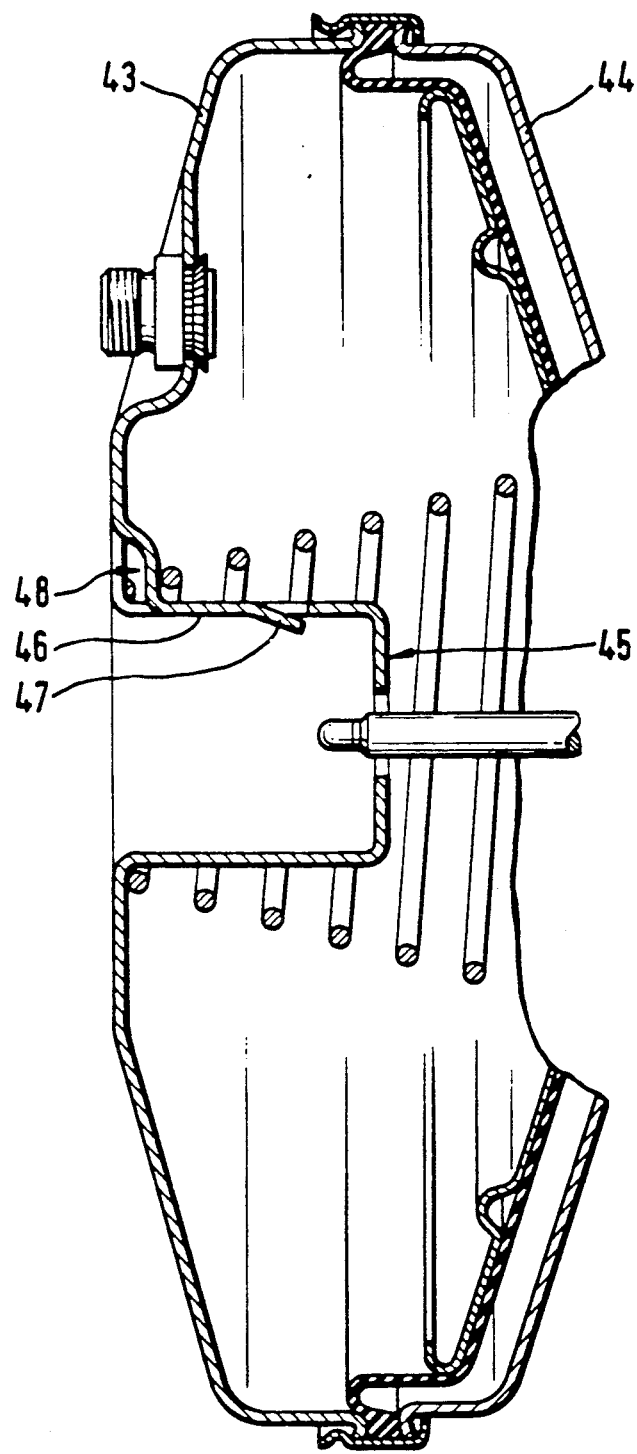
FIG. 5 is a cross-sectional view of the sheet or plate steel housing of a vacuum brake power booster.

In FIG. 5, the housing of the vacuum brake power booster, substantially composed of two sheet or plate steel shells 43 and 44, is shown. The combination of a vacuum brake power booster with a master cylinder is well known. According to the embodiment of the present invention shown in FIG. 5, the sheet or plate steel shell 43 of the housing is formed with a cup 45. This cup may be fabricated by deep drawing. When the master cylinder and the vacuum brake power booster are assembled, the booster-side end of the master cylinder is received in the cup 45. A plurality of lugs, for example three of them, one of which is identified by reference numeral 47 in FIG. 5, is provided in the lateral wall 46 of the cup. These lugs engage corresponding depressions arranged in the outside wall of the master cylinder housing. Assembly of the master cylinder and the vacuum brake power booster may be accomplished by the lugs snapping into the corresponding depressions, for example, into a recess, such as the one identified by reference numeral 30 in FIG. 1. Such an arrangement provides a safe and low-cost assembly of the two components. In addition, connecting elements, such as threaded pins used in prior art assemblies, are unnecessary.

In the region 48 of the booster housing, a depression may be provided for receiving a lug arranged on the master cylinder. This lug serves to position the booster housing and the master cylinder.

What is claimed is:

1. A process for the manufacture of a piston and cylinder assembly comprising the steps of:
    providing a mold having a surface corresponding to the outside surface of the cylinder to be cast;
    positioning within said mold cores having shapes corresponding to spaces in the cylinder to be cast, with selected cores which define spaces to be connected spaced apart a predetermined distance;
    introducing casting material into said mold to form a cylinder casting having a thin film between said selected cores;
    removing said casting from said mold and said cores from said casting;
    and mechanically removing said thin film to form openings between said spaces previously separated by said thin film to connect said spaces.

2. A process according to claim 1 wherein said thin film is mechanically removed by stamping.

3. A process according to claim 1 wherein said thin film is mechanically removed by machining.

4. A process according to claim 1 wherein portions of said thin film are mechanically removed by machining and further portions of said thin film are removed by stamping.

5. A process according to claim 1 wherein said casting material is selected from the group consisting of pressure die casting starting material, squeeze die casting starting material, and other fluid, semifluid, semisolid, or pasty starting material.

6. A process according to claim 1 wherein said casting material is semisolid metal starting material.

7. A process according to claim 1 wherein said piston and cylinder assembly is a master cylinder and push rod piston combination.

* * * * *